US012753475B2

(12) United States Patent
Lentz et al.

(10) Patent No.: US 12,753,475 B2
(45) Date of Patent: Oct. 6, 2026

(54) HIGH-STRENGTH SOLDER-PLATED Al—Mg—Si ALUMINUM MATERIAL

(71) Applicants: Martin Christoph Lentz, Bonn (DE); Nico Eigen, Hamburg (DE); Volker Sass, Niederkassel-Mondorf (DE)

(72) Inventors: Martin Christoph Lentz, Bonn (DE); Nico Eigen, Hamburg (DE); Volker Sass, Niederkassel-Mondorf (DE)

(73) Assignee: Speira GmbH, Grevenbroich (DE)

(*) Notice: Subject to any disclaimer, the term of this patent is extended or adjusted under 35 U.S.C. 154(b) by 0 days.

(21) Appl. No.: 17/945,656

(22) Filed: Sep. 15, 2022

(65) Prior Publication Data

US 2023/0078028 A1 Mar. 16, 2023
US 2026/0185202 A2 Jul. 2, 2026

Related U.S. Application Data

(63) Continuation of application No. PCT/EP2021/059143, filed on Apr. 8, 2021.

(30) Foreign Application Priority Data

Apr. 8, 2020 (EP) .................................... 20168844

(51) Int. Cl.
*C22F 1/043* (2006.01)
*B23K 1/19* (2006.01)
(Continued)

(52) U.S. Cl.
CPC ................ *C22F 1/043* (2013.01); *B23K 1/19* (2013.01); *B32B 15/016* (2013.01); *C22C 21/02* (2013.01);
(Continued)

(58) Field of Classification Search
CPC . C22F 1/043; C22F 1/047; B23K 1/19; B23K 2101/34; B23K 2103/10;
(Continued)

(56) References Cited

U.S. PATENT DOCUMENTS

2010/0279143 A1 11/2010 Kamat et al.
2011/0287276 A1 11/2011 Izumi et al.
(Continued)

FOREIGN PATENT DOCUMENTS

CN 103805820 A 5/2014
CN 104080935 A 10/2014
(Continued)

OTHER PUBLICATIONS

SE-514234-C2, Schoelin et al, machine translation. (Year: 2001).*
(Continued)

*Primary Examiner* — John A Hevey
(74) *Attorney, Agent, or Firm* — Reinhart Boerner Van Deuren P.C.

(57) ABSTRACT

The present disclosure provides an aluminium material for the manufacture of high-strength, soldered components, including an aluminium alloy. After soldering, the aluminium material is in materially-bonded contact with at least one solder layer. The object of providing an aluminium material is to provide not only good soldering properties and formability, but also high strength. This is achieved because the aluminium alloy of the aluminium material has a solidus temperature, and the aluminium material has an increase in yield strength compared to the state after soldering and cooling.

15 Claims, 5 Drawing Sheets

(51) Int. Cl.

| | |
|---|---|
| ***B23K 101/34*** | (2006.01) |
| ***B23K 103/10*** | (2006.01) |
| ***B32B 15/01*** | (2006.01) |
| ***C22C 21/02*** | (2006.01) |
| ***C22C 21/06*** | (2006.01) |
| ***C22F 1/047*** | (2006.01) |

(52) U.S. Cl.
CPC .............. *C22C 21/06* (2013.01); *C22F 1/047* (2013.01); *B23K 2101/34* (2018.08); *B23K 2103/10* (2018.08)

(58) Field of Classification Search
CPC .. B23K 1/203; B23K 35/0238; B23K 1/0012; B23K 2101/14; B23K 35/286; B23K 2103/08; B32B 15/016; C22C 21/02; C22C 21/06
See application file for complete search history.

(56) References Cited

U.S. PATENT DOCUMENTS

| | | | | |
|---|---|---|---|---|
| 2013/0302642 A1* | 11/2013 | Ren | C22C 21/02 | 428/654 |
| 2014/0193666 A1* | 7/2014 | Brinkman | B23K 20/04 | 428/654 |
| 2014/0220381 A1* | 8/2014 | Muller | C22F 1/05 | 428/654 |
| 2020/0368852 A1* | 11/2020 | Ren | B23K 35/288 | |

FOREIGN PATENT DOCUMENTS

| | | | | |
|---|---|---|---|---|
| CN | 105377492 A | 3/2016 | | |
| CN | 108136545 A | 6/2018 | | |
| EP | 0718072 A1 | 6/1996 | | |
| EP | 1505163 A2 | 2/2005 | | |
| EP | 1712319 A1 | 10/2006 | | |
| FR | 2185946 A5 | 1/1974 | | |
| JP | H04178293 A | 6/1992 | | |
| JP | 2005533659 A | 11/2005 | | |
| JP | 2007500784 A | 1/2007 | | |
| JP | 2011042823 A | 3/2011 | | |
| JP | 2011241434 A | 12/2011 | | |
| JP | 2011241435 A | 12/2011 | | |
| JP | 2014028389 A | 2/2014 | | |
| JP | 2014077179 A | 5/2014 | | |
| JP | 2014098185 A | 5/2014 | | |
| SE | 514234 C2 * | 1/2001 | | B23K 35/28 |
| WO | WO 0249798 A2 | 6/2002 | | |
| WO | WO 2005/010223 A1 | 2/2005 | | |
| WO | WO 2017182145 A1 | 10/2017 | | |
| WO | WO 2019164487 A1 | 8/2019 | | |

OTHER PUBLICATIONS

Demi produits aluminium, Pechiney Rhenalu, May 1997, Connaissances generales.
Teal Sheets, The Aluminum Association, Aug. 2018, Connaissances generales.
Aluminium Brazing ; News, Knowledge & Technology; Cladding Alloys ; Sep. 10, 2019 ; Source: https://www.aluminium-brazinq.com/2010/09/29/cladding-alloys/; Connaissances generales.
FactStage 8.3 ; Source: https://www.factsage.com/; Jun. 24, 2024.
Heat Exchanger Aluminum, Aleris Corporation, 2014, Connaissances generales.
The Aluminium Automotive Manual, Applications—Power train—Heat exchangers, European Aluminium Association, 2011, Connaissances generales.
MulticladTM tube product for CAB, Granges, 2018.
NF EN 515, Aluminium et alliages d'aluminium—Produits corroyes—Designation des etats metallurgiques, Apr. 15, 2017, Connaissances general es.
Development of high strength sheet crash alloy for BiW structures—Dr. A. Afseth, Constellium CRV, Materials in Car Body Engineering 2013, May 7-8, 2013.
Usage anterieur: certificat de reception, Feb. 1, 2018.
Usage anterieur : avis expedition, Feb. 1, 2018.
Usage anterieur: livraison BMW, Mar. 1, 2018.
Usage anterieur : facture, Mar. 2, 2018.
Usage anterieur: paiement BMW, Feb. 3, 2018.
Usage anterieur : affidavit.
Controlled atmosphere brazing of heat treatable alloys with cesium flux, H. Johannson et al,C599/013/2003, IMechE 2003.
Controlled atmosphere brazing of aluminum, H. Zhao et al, Woodhead Publishing Limited, 2013.
A. Magnusson et al, "Multiclad—A Way To Handle Mg Containing Alloys in Controlled Atmosphere Brazing", 1999 International Invitational Aluminium Brazing Seminar Oct. 1999, Dearborn MI, USA.
T Stenqvist et al, "Brazeability of FA7827 multiclad, evaluated with a simple test", 2000 International Invitational Aluminium Brazing Seminar Oct. 2000, Dearborn MI, USA.
T. Stenqvist, "A New High Strength Aluminium Alloy for Controlled Atmosphere Brazing", Proceedings of the 2001 Vehicle Thermal Management Systems Conference, May 2001, pp. 325-331.
E. Ghali, "Corrosion Resistance of Aluminium and Magnesium Alloys, Understanding, Performance and Testing", 2010, pp. 183-185.
Affidavit by Mr. Torkel Stenqvist.
Affidavit by Mr. Simon Borg.
Inspection Certificate 167648 Jun. 16, 1999—Order 431148 Serck.
Inspection Certificate 272634 Nov. 20, 2008—Order 483856 TitanX.
Invoice 165353 Nov. 20, 2008—Order 483856 TitanX.
Inspection Certificate 285206 Feb. 8, 2010—Order 489444 TitanX.
Packing list 176103 Feb. 8, 2010—Order 489444 TitanX.
Invoice 176103 Feb. 8, 2010—Order 489444 TitanX.
Cert 428812 Apr. 4, 2018—Order 141401 Radiadores.
Packing list 277 425 Apr. 7, 2018—Order 141401 Radiadores.
Invoice 277425 Apr. 7, 2018—Order 141401 Radiadores.
Inspection Certificate 431917 May 23, 2018—Order 142167 TitanX.
Packing list 757763 May 22, 2018—Order 142167 TitanX.
Invoice 757763 MMay 22, 2018—Order 142167 TitanX.
Inspection Certificate 446314 Feb. 1, 2019 S—Order 147354 TitanX.
Packing list 761202 Feb. 4, 2019—Order 147354 TitanX.
Invoice 761202 Feb. 4, 2019—Order 147354 TitanX.
Affidavit by Mr. Karl Kullerback.
European Opposition Aug. 30, 2024.
European Opposition Sep. 3, 2024.

* cited by examiner

HIGH-STRENGTH SOLDER-PLATED Al—Mg—Si ALUMINUM MATERIAL

CROSS-REFERENCE TO RELATED PATENT APPLICATIONS

This patent application is a continuation of International Application No. PCT/EP2021/059143, filed on Apr. 8, 2021, which claims the benefit of priority to European Patent Application No. 20168844.7, filed Apr. 8, 2020, the entire teachings and disclosures of both applications are incorporated herein by reference thereto.

FIELD

The invention relates to an aluminium material for the manufacture of high-strength, soldered components comprising an aluminium alloy of the type AA6xxx, wherein preferably the aluminium material is at least in some areas directly or indirectly in materially-bonded contact with at least one solder layer after soldering. According to one embodiment, the invention relates to an aluminium composite material comprising at least one core layer comprising the aluminium material according to the invention as an aluminium core alloy layer and at least one outer solder layer comprising an aluminium solder alloy, wherein the solder layer is arranged on the core layer. The invention also relates to a method for the thermal joining of components, to the use of the aluminium material or of the aluminium composite material in a thermal joining process as well as to a soldered component.

BACKGROUND

Hardenable aluminium materials based on AlMgSi alloys, the main alloy components of which are magnesium and silicon, are known for applications in the automotive sector, but also in other areas of application such as aircraft construction or rail vehicle construction. These are not only characterised by particularly high strength values, but also have very good forming behaviour and enable high degrees of forming. Typical areas of application include the body, body components such as doors, hatches, hoods, etc. and chassis parts. The mechanical requirements for corresponding components include withstanding the considerable loads that occur in practical use on components installed in motor vehicles due to shocks, prolonged vibrations, corrosion, high operating pressures, high operating temperatures and temperature changes. In order to increase the strength, annealing is carried out as solution annealing at temperatures above the solvus and below the solidus temperature of the respective material and this is then cooled at a high and defined speed. The maximum strength is then determined after a subsequent artificial ageing at temperatures between 100 and 220° C., for example in the case of a paint bake treatment in the form of a cathodic dip painting at approx. 200° C. over approx. 15 min.

The use of AlMgSi alloys is also known for solderable as well as solder-plated materials, for example for high-strength heat exchanger applications. Motor vehicle heat exchangers are usually manufactured from aluminium strips or sheets by thermally joining together the individual prefabricated components of the heat exchanger, such as for example fins, pipes and distributors. Corresponding heat exchangers are mostly components of the heating and cooling systems in motor vehicles. The various tasks of such thermally joined heat exchangers made of aluminium materials include cooling of cooling water or oil, use as charge air coolers and use in air-conditioning systems. Concepts for large-area cooling plates are known in the field of cooling batteries for electric vehicles. These typically consist of a thicker flat base plate and a structured second plate with moulded cooling channels. Among other joining methods, thermal joining is in most cases carried out as brazing under inert gas atmosphere using non-corrosive flux, which is known as the "controlled atmosphere brazing" (CAB) process. For cost reasons, however, there is generally no separate artificial ageing here. In addition, the common aluminium materials made of an aluminium alloy such as EN-AW 6063 have only a slight hardening effect at the typical cooling rates when soldering.

In addition, the achievable strength is limited by limitations in the chemical composition, in particular in the elements silicon and magnesium, which are responsible for the hardenability, as well as the dispersoid-forming agents manganese and chromium. To prevent melting, the solidus temperature of the material must not be lower than the soldering temperature, which is typically 590° C. to 610° C. High-strength to medium-strength AlMgSi alloys generally have comparatively high Mg and Si contents. In AlMgSi alloys, small metastable precipitates of the β (or $Mg_2Si$) precipitation sequence (Cluster→Guinier Preston Zones (GP Zones)→β"→β', U1, U2, B', →β, Si) form during the ageing process, which contain both Mg and Si and increase the strength, whereby in particular the GP Zones and the β" phases are observed with maximum strength. Thus, the trivial solution for increasing the strength appears to be to increase the Mg and Si content so that more strength-enhancing precipitates of the β precipitation sequence can form. However, the Mg content of the aluminium material can impair the solderability of the material in the so-called CAB soldering process, in which the aluminium components are generally soldered using fluxes and are exposed to a precisely controlled atmosphere, for example a nitrogen atmosphere, during the soldering process, since the Mg reacts with the flux during the soldering process with the formation of high-melting phases and thus loses its function. The processability up to higher Mg contents of more than 0.3 wt.-% can only be extended by the use of expensive fluxes containing caesium. In addition to excessively low mechanical strength, the CAB process with the previously available aluminium materials also results in the problem of low corrosion resistance.

An alternative to the CAB process is vacuum soldering, in which the components to be soldered are soldered in an atmosphere with very low pressure, for example $10^{-5}$ mbar or less. Vacuum soldering can be done without flux, but a certain amount of magnesium is often added to the aluminium solder to achieve a better solder result. The disadvantage of vacuum soldering is also that maintaining the vacuum and the cleanliness requirements for the components to be soldered are very costly.

Due to the high strength requirements for structural components of a motor vehicle, for example for body components, soldered structural components have not yet been used. Previous heat exchangers generally do not take on the tasks of structural components in motor vehicles, so crash resistance is not required. Existing heat exchangers have low strength and therefore require far-reaching design measures to achieve the required mechanical crash properties. In addition, functional integration of further properties is desirable, which include, among others, high formability before soldering and sufficient corrosion resistance in use. This property profile is not sufficiently fulfilled by the conventional materials.

This applies in particular if the aluminium materials undergo soldering processes and preferably are at least in some areas directly or indirectly in materially-bonded contact with at least one solder layer comprising an aluminium solder alloy. In the case of direct materially-bonded contact, the aluminium material immediately adjoins a solder layer of a participating component of the soldering process after soldering. This can be done by soldering with a solder-plated component, by using a soldering foil or other methods. If the aluminium material is designed as an aluminium composite material, the direct materially-bonded contact can be provided after soldering by the plated solder alloy layer. Indirect contact is understood to mean materially-bonded contact with the solder layer via at least one further alloy layer, i.e. if, for example, the aluminium material is provided with a further aluminium layer, which does not comprise a solder alloy, with which, however, this is in turn connected in a materially-bonded manner at least in some areas with an, for example, solder-plated component. In principle, the strength properties of aluminium materials that undergo a soldering process, whether or not they are bonded with a solder layer, are significantly influenced by the heat exposure in the soldering process. As a rule, the strength drops significantly immediately after the soldering process.

The European patent application EP 1 505 163 A2, which goes back to the applicant, discloses high-strength aluminum alloys of type AA6xxx for brazed heat exchangers, but gives no indication of the interaction of the disclosed aluminum alloys with a hot aging after brazing. This also applies to international patent application WO 2005/010223 A1, which goes back to the applicant.

US patent application US 2011/0287276 A1, on the other hand, relates to an aluminum alloy for heat exchangers containing at least 0.6 wt.-% of manganese and thus to an AA3xxx alloy which is not age-hardenable per se.

US patent application US 2010/0279143 A1 describes AlMgSi aluminum alloys used in car bodies. A brazed aluminum material is not disclosed.

BRIEF SUMMARY

The object underlying the present invention is therefore to provide an aluminium material and an aluminium composite material comprising this aluminium material, which not only has good soldering properties and good formability, but also provides high strength after soldering. The object underlying the present invention is also to propose an advantageous, in particular cost-effective method for the thermal joining of components, advantageous uses of the aluminium material or aluminium composite material according to the invention and advantageous thermally joined components.

According to a first teaching of the present invention, the aforementioned object is solved for an aluminium material or aluminium composite material mentioned at the outset in that the aluminium alloy of the aluminium material or the aluminium core alloy of an aluminium composite material has a solidus temperature Tsol of at least 595° C. and the aluminium material or the aluminium composite material has, after soldering at at least 595° C. and cooling at an average cooling rate of at least 0.5° C./s from 595° C. to 200° C. and an artificial ageing at 205° C. for 45 minutes, an increase in the yield strength $R_{p0.2}$ compared to the state after soldering of at least 90 MPa, at least 110 MPa or preferably at least 120 MPa.

The aluminium material or the aluminium composite material according to the invention has sufficient reserves due to the selected solidus temperature in order to reliably avoid melting in the soldering process. Due to the large increases in strength after artificial ageing, an aluminium material and an aluminium composite material are provided, which provides large yield strength values in the soldered and artificially-aged state. High-strength, soldered components can be produced with the aluminium material or the aluminium composite material. Since the increase in strength only takes place after soldering through artificial ageing, the aluminium material or the aluminium composite material can be provided in a highly formable state, formed and then hardened by the soldering process with artificial ageing. The claimed increase in the yield strength at defined cooling rates requires that the structure of the aluminium material and of the aluminium core alloy of the aluminium composite material must provide low quenching sensitivity.

The aluminium material or aluminium composite material according to the invention is preferably strip-shaped and designed as a rolled sheet. Both plating, in particular roll cladding, and simultaneous casting can be used in the manufacture of the aluminium alloy composite material. It is also possible to apply the layers by thermal spraying. However, roll cladding and simultaneous casting are the methods currently used on a large industrial scale to manufacture an aluminium composite material, wherein the simultaneously cast material differs from the discrete layer compositions of the roll cladded material due to its notable concentration gradients between the different aluminium alloy layers. During roll cladding, the rolling ingot is first cast from the aluminium core alloy and optionally homogenised. The overlays are usually hot-rolled from a cast rolling ingot to the required thickness and cut to the required length. Alternatively, the overlays can also be manufactured by sawing from a rolling ingot. The overlays with the core alloy are then assembled into a packet and heated to the hot rolling temperature. Alternatively, homogenisation can also take place after forming the packet. The packet preheated to the hot-rolling temperature is then hot-rolled to an intermediate thickness and finally cold-rolled to the final thickness with or without intermediate annealing. A final optional solution or soft annealing/back annealing can follow the cold rolling. It is also conceivable that the aluminium composite material is in the form of sheets, which are separated from a strip, for example. The aluminium material can for example be manufactured by casting an ingot or a casting strip, homogenising the ingot or casting strip, hot rolling and cold rolling.

Preferably, the aluminium material or the aluminium composite material has, after soldering at at least 595° C. and cooling at an average cooling rate of at least 0.5° C./s from 595° C. to 200° C. and an artificial ageing at 205° C. for 45 minutes, a yield strength $R_{p0.2}$ of at least 150 MPa, preferably at least 180 MPa, particularly preferably more than 200 MPa. Due to the low quenching sensitivity of the aluminium alloy of the aluminium material or of the aluminium core alloy of the aluminium composite material, this enables high yield strength values even at the cooling rates from the soldering process. The high yield strength values therefore allow the manufacture of components with smaller wall thicknesses without melting occurring in the soldering process.

Prior to soldering, the aluminium material or the aluminium composite material can for example be in a strain-hardened, for example in an as rolled- or fully through-hardened (4/4-hard), or soft-annealed state. In a further embodiment, the aluminium composite material can be in the solution-annealed state "T4" prior to soldering. Highly-formable states are preferred in order to fully exploit the forming potential of the aluminium composite material during the manufacture of the components to be soldered. Due to the selected composition and production route of the aluminium material or of the core material, the quenching sensitivity is set such that the soldering process can, for example, act as solution annealing in a typical CAB process, wherein the average cooling rates are at least 0.5° C./s between the soldering temperature and 200° C. The aluminium composite material can thus be transferred to the advantageous T4 state after soldering, which enables hardening by means of an artificial ageing.

The artificial ageing takes place, for example, at an ageing temperature of between 100° C. and 280° C., preferably of between 140° C. and 250° C., preferably at 180° C. and 230° C. for at least 10 minutes, preferably at least 30 minutes or at least 45 minutes and enables strengths $R_{p0.2}$ of at least 150 MPa to be achieved. The artificial ageing can be carried out immediately after soldering, but also later. When carried out immediately afterwards, i.e. if the components are artificially aged at 205° C. for 45 minutes after soldering, the energy costs can be reduced.

According to a further embodiment of the aluminium material or of the aluminium composite material, the aluminium alloy of the aluminium material or the aluminium core alloy of the aluminium composite material is an aluminium alloy of the type AlMgSi, in particular of the type AA6xxx and has the following composition in wt.-%:

0.5%≤Si≤0.9%, preferably 0.50%≤Si≤0.65% or 0.60%≤Si≤0.75%,

Fe≤0.5%, preferably 0.05%≤Fe≤0.5%, particularly preferably 0.05%≤Fe≤0.3%,

Cu≤0.5%, preferably 0.05%≤Cu≤0.3% or 0.1%≤Cu≤0.3%,

Mn≤0.5%, preferably Mn≤0.2%, particularly preferably 0.01%≤Mn≤0.15%, 0.4%≤Mg≤0.8%, preferably 0.45%≤Mg≤0.8%, particularly preferably 0.45%≤Mg≤0.75%, Cr≤0.3%, preferably Cr≤0.1%, particularly preferably Cr≤0.05%, Zn≤0.3%, preferably ≤0.05%, Ti≤0.3%, Zr≤0.1%, particularly preferably Zr≤0.05%, the remainder Al and unavoidable impurities individually a maximum of 0.05%, in total a maximum of 0.15%.

With the aid of a corresponding composition of the aluminium alloy of the aluminium material or the core layer of the aluminium composite material, particularly favourable crash properties can be achieved through high strength and ductility. At the same time, an increased strength of the composite material enables a reduction in wall thickness through hardening after soldering and artificial ageing.

Silicon enables the material to harden by forming fine intermetallic precipitation phases of the β (or Mg2Si) precipitation sequence (Cluster→Guinier Preston Zones (GP Zones)→β"→β', U1, U2, B', →β, Si. An excessively low content of silicon leads to an excessively low hardening effect, while excessively high contents reduce the solidus temperature of the material. A minimum content of silicon of 0.5 wt.-% is therefore sought, while the maximum content is limited to 0.9 wt.-%. The Si content is further preferably limited to 0.50 wt.-%≤Si≤0.65 wt.-% or to 0.50 wt.-%≤Si≤0.60 wt.-% in order to combine a particularly large process window during soldering with a significant increase in strength due to artificial ageing. With a restriction to 0.60 wt.-%≤Si≤0.75 wt.-%, a higher increase in strength can be achieved for soldering with a smaller process window due to the artificial ageing.

Iron has a negative influence on the strength properties of the material, since iron already forms very stable intermetallic phases with silicon during the casting process in the material manufacture and thus removes the silicon required for the desired hardening effect from the material. On the other hand, iron is typically present in significant contents both in primary aluminium and in aluminium scrap, such that a very low iron content would make the manufacture of the material unacceptably more expensive. The maximum iron content of the alloy is therefore limited to a maximum of 0.5 wt.-%. Preferably, the alloy contains iron in the range of 0.05 wt.-% to 0.5 wt.-% or 0.05 wt.-% to 0.3 wt.-% in order, on the one hand, to be able to use recycled aluminium to manufacture the aluminium material or the aluminium core alloy and, at the same time, to increase the proportion of silicon available for hardening.

In AlMgSi alloys, copper can have a positive effect on the artificial ageing of the material. It is known from the literature that the type of hardening phase of $Mg_2Si$ shifts towards a quaternary Q phase AlMgSiCu. It also speeds up the kinetics of the hardening. On the other hand, copper lowers the solidus temperature of the material and thereby narrows the process window for a brazing process, as the maximum soldering temperature must be below the solidus temperature of the materials to be soldered. The content of copper in the core alloy is therefore limited to a maximum of 0.5 wt.-%, preferably 0.05 wt.-%≤Cu≤0.3 wt.-%, particularly preferably to a maximum of 0.10 wt.-%≤Cu≤0.3 wt.-%. Below 0.05 wt.-%, the effect of copper on hardening is lower. Above 0.1 wt.-%, the kinetics of the hardening is improved without significantly reducing the solidus temperature at a maximum value of 0.3 wt.-%.

Manganese increases the strength of aluminium materials through mixed crystal hardening and the formation of fine intermetallic phases. However, it is also known that manganese increases the quenching sensitivity of AlMgSi alloys and requires very high cooling rates after a solution annealing treatment. In order to be able to achieve a sufficient hardening effect even at the cooling rates achievable in an industrial soldering process, the manganese content must be limited to a maximum of 0.5 wt.-%, preferably to a maximum of 0.2 wt.-%. With an Mn content of 0.01 wt.-%≤Mn≤0.15 wt.-%, both mixed crystal hardening and low quenching sensitivity are achieved.

In combination with silicon, magnesium enables the material to harden by forming fine intermetallic precipitation phases. An excessively low content of magnesium leads to an excessively low hardening effect, while excessively high contents reduce the solidus temperature of the material and thus narrow the process window too much for a brazing process, since the maximum soldering temperature must be below the solidus temperature of the materials to be soldered. A minimum content of magnesium of 0.4 wt.-% is therefore sought, while the maximum content is limited to 0.8 wt.-%. The high strengths are achieved by precipitation hardening due to the Mg content in combination with the selected Si content. For this purpose, the Mg content is preferably limited to 0.45 wt.-% to 0.80 wt.-%, more preferably to 0.45 wt.-% to 0.75 wt.-%.

Chromium forms fine intermetallic precipitation phases in aluminium materials, which counteract a coarsening of the grain size during heat treatments. On the other hand, it is known that chromium increases the quenching sensitivity of AlMgSi alloys and thus requires high cooling rates after a solution annealing treatment. In order to be able to achieve a sufficient hardening effect even at the cooling rates achievable in an industrial soldering process, the chromium content must be limited to a maximum of 0.3 wt.-%, preferably to a maximum of 0.1 wt.-%, particularly preferably to a maximum of 0.05 wt.-%.

Zinc is used in aluminium alloys to influence the corrosion potential, among others. Since zinc shifts the corrosion potential in a less noble direction, the content in the aluminium material or the core alloy must be limited to a maximum of 0.3 wt.-%, preferably to a maximum of 0.1 wt.-%, particularly preferably to 0.05 wt.-%. An excessively strict limitation of the zinc content would limit the use of scrap in material manufacture too much.

Titanium is used as a grain finer when casting aluminium alloys, e.g. in the form of TiB. An excessively strict limitation of the titanium content would limit the use of scrap in material manufacture too much, therefore a maximum titanium content of 0.3 wt.-% is specified.

Zirconium forms fine intermetallic precipitation phases in aluminium materials, which counteract a coarsening of the grain size during heat treatments. However, zirconium usually needs to be added to the alloy. Preferably, for a sufficient effect, Zr contents are contained in a maximum of 0.1 wt.-%, preferably a maximum of 0.05 wt.-% in the aluminium alloy or in the aluminium core alloy.

According to a further configuration, the aluminium solder alloy, with which the aluminium material is at least in some areas in direct or indirect materially-bonded contact after soldering or the solder layer of the aluminium composite material has the following composition in wt.-%:

7.0%≤Si≤13.0%,
Fe≤0.8%,
Cu≤2.5%,
Mn≤0.1%,
Mg≤0.1%,
Cr≤0.1%,
Zn≤2.5%,
Ti≤0.3%,
Zr≤0.1%, the remainder Al and unavoidable impurities individually a maximum of 0.05%, in total a maximum of 0.15%.

Aluminium solder alloys with a corresponding composition have a particularly low melting point. The melting temperature of the aluminium solder alloy is in particular lower than the solidus temperature of the aluminium alloy of the aluminium material or of the aluminium core alloy and of the aluminium alloy of a cladding layer, which can be provided and is not a solder layer. Preferably, the aluminium solder alloy of the solder layer is of the type AA4xxx, particularly preferably of the type AA4343 or AA4045, which in particular exhibit excellent soldering properties when used in heat exchangers.

Preferably, the aluminium material is designed as an aluminium composite material, wherein the aluminium composite material comprises at least one one-sided or two-sided outer solder layer having an aluminium solder alloy. The aforementioned solder alloy composition is preferably used for the solder layer of the aluminium composite material.

According to a further embodiment, the aluminium material or the aluminium composite material has at least one cladding layer provided on one or both sides on the aluminium material or the core layer of the aluminium composite material, wherein the cladding layer has an aluminium alloy with an Mg content of <0.1 wt.-%, preferably <0.05 wt.-%.

Surprisingly, it has been shown that the cladding layer of the aluminium material or of the aluminium composite material according to the invention has the role of a multifunctional layer. This embodiment of the aluminium material or composite material therefore entails a novel combination of properties. In addition to high strength compared to other soldered materials, high corrosion resistance after soldering and high formability before soldering can also be achieved. Favourable crash properties can also be achieved through the high strength and ductility. The composite material, which has a low-magnesium cladding layer on one or both sides, can also be soldered in the CAB soldering process with relatively high Mg contents using standard fluxes. In addition to the otherwise expensive vacuum soldering, cost-effective CAB soldering with flux is also available as a joining process, whereby the need for expensive fluxes containing caesium is also eliminated. For example, a cost-effective standard Nocolok® flux is instead sufficient. The cladding layer allows soldering under inert gas and using standard fluxes as the Mg concentration on the surface of the composite material is minimised. The cladding layer counteracts the diffusion of Mg from the core to the surface of the solder plating.

If an aluminium alloy with an Mg content of maximum 0.1 wt.-% is used as at least one cladding layer, aluminium composite materials can for example be manufactured with established alloys which have extremely good forming properties in the composite. It has been recognised that core layers made of an aluminium core alloy of the type AlMgSi, on which a cladding layer with an Mg content of maximum 0.1 wt.-% is applied, can have significantly increased bending angles in the plate bending test compared to mono-AA6xxx alloys of the same composition, whereby a significantly increased ductility of the composite material is proven. The cladding layer, which is arranged, for example, on the non-solder-plated side, thus improves the bending angles of the claimed multi-layer composite. On the one hand, an increase in the bending angle is necessary for production steps such as e.g. folding and, on the other hand, the achievable bending angle correlates with a high ductility in the event of a crash. The combination of a higher-strength core material with ductility-enhancing plating consequently improves performance in the event of a crash, for example of a structural component. An improved underbody protection of a battery box can also be achieved, for example. With this embodiment of the composite material according to the invention comprising a corresponding cladding layer, the formability is also significantly increased compared to mono-AA6xxx materials and composite materials solder-plated on one side.

The aluminium alloy of the at least one cladding layer preferably has an Mg content of a maximum of 0.05 wt.-%, particularly preferably a maximum of 0.01 wt.-%. With a further limitation of the Mg content, the solderability of the aluminium composite material can be further increased. Formability is also further improved, which also promotes bonding to the core layer.

In addition, a SWAAT corrosion test in accordance with ASTM G85-A3 found that the corrosion attack in the soldered state is concentrated on the cladding layer and thus a corrosion attack on the core material is prevented. The cladding layer thus simultaneously plays the role of a sacrificial anode for the electrochemically more noble core material and a high level of corrosion resistance can be achieved. A prerequisite for this is that the cladding layer has a corrosion potential that is less noble than the core material after soldering.

In particular, at least one cladding layer is applied on one or both sides of the core layer. Three layers are provided in a particularly simple embodiment of the aluminium composite material, wherein the cladding layer is arranged on one side and the solder layer on the other side of the core layer. It is also conceivable that the cladding layer is arranged between the core layer and the solder layer. This embodiment is particularly advantageous for corrosion protection and soldering behaviour, since the cladding layer serves as a diffusion barrier for Mg and at the same time the corrosion attack on the core is reduced or prevented. In this embodiment, the cladding layer is preferably arranged directly on the core layer. In addition to a three-layer structure, other conceivable composite materials are also possible. In a four-layer variant, a further cladding layer or solder layer is also provided on the side of the core layer facing away from the cladding layer and the solder layer. Furthermore, a five-layer variant can be provided, wherein in each case a cladding layer is provided on both sides of the core layer and in each case an outer solder layer is provided. The cladding layer can thus be an outer and/or an intermediate layer.

According to a further embodiment of the aluminium material or of the aluminium composite material according to the invention, the aluminium alloy of the cladding layer has the following composition in wt.-%:

Si≤1.0%,
Fe≤2.0%, preferably 0.1%≤Fe≤2.0%,
Cu≤0.3%,
Mn≤0.3%,
Mg≤0.1%, preferably ≤0.05%,
Cr≤0.1%,
Zn≤2.0%,
Ti≤0.3%,
Zr≤0.20%, the remainder Al and unavoidable impurities individually a maximum of 0.05%, in total a maximum of 0.15%.

An improved formability of the composite material can advantageously be achieved with a corresponding composition of the cladding layer. In particular, variants with an outer cladding layer on one side achieve a reduction in friction, for example during deep drawing in the deep drawing tool, and thus improved formability. In the plate bending test, corresponding composite materials achieve significantly increased bending angles compared to mono-AA6xxx alloys of the same composition. The outer cladding layer of the non-solder-plated side thus improves the bending angles of the entire composite material.

The effect of the individual alloy elements in the cladding layer and the definition of the composition ranges are explained in more detail below:

Silicon can be added to the alloy to increase strength, and silicon is also contained in many aluminium scraps that can be used to melt the material. Excessively high contents of silicon lower the solidus temperature of the material too much and thus narrow the process window too much for a brazing process, as the maximum soldering temperature must be below the solidus temperature of the materials to be soldered. The maximum content of silicon is therefore limited to a maximum of 1.0 wt.-%.

Iron is used in alloys of the type AlFeSi in combination with silicon to limit the grain size. A small grain size has proven to be positive for the forming effect of the cladding layer. In contrast, excessively high iron contents lead to the formation of coarse intermetallic casting phases, which negatively influence the forming behaviour of the material. The maximum iron content of the alloy is therefore limited to a maximum of 2.0 wt.-%, preferably a range of 0.1%≤Fe≤2.0% is sought.

Copper lowers the solidus temperature of the material and thereby narrows the process window for a brazing process, as the maximum soldering temperature must be below the solidus temperature of the materials to be soldered. The maximum content of copper in the cladding layer is therefore limited to a maximum of 0.3 wt.-%. Manganese increases the strength of aluminium materials through mixed crystal hardening and the formation of fine intermetallic phases. In the case of the cladding layer, an excessively high strength is undesirable for achieving the desired effect of improved formability and improved crash properties of the composite material. The maximum content of manganese in the cladding layer is therefore limited to a maximum of 0.3 wt.-%.

Magnesium is critical in a brazing process under inert gas atmosphere using flux, as the solubility of flux for magnesium oxide is limited. The function of the cladding layer in the composite material is therefore to prevent direct contact of the magnesium-containing core material with the soldering zone, either as an outer layer of the composite material or as an intermediate layer between the core material and the solder layer. Therefore, the maximum content of magnesium in the cladding layer is limited to a maximum of 0.1 wt.-%, preferably a maximum of 0.05 wt.-%.

Chromium forms fine intermetallic precipitation phases in aluminium materials, which counteract a coarsening of the grain size during heat treatments. A sufficient effect is achieved with a maximum chromium content of 0.1 wt.-%.

Zinc is used in aluminium alloys to influence the corrosion potential, among other things. By selectively adding zinc to the cladding layer, the corrosion potential can be adjusted after a soldering process such that it is less noble than that of the core alloy and the cladding layer acts as a sacrificial anode and provides galvanic corrosion protection for the core alloy. Excessively high contents of zinc lower the solidus temperature of the material too much and thus narrow the process window too much for a brazing process, as the maximum soldering temperature must be below the solidus temperature of the materials to be soldered. The maximum content of zinc in the cladding layer must therefore be limited to a maximum of 2.0 wt.-%.

Titanium is used as a grain finer when casting aluminium alloys, e.g. in the form of TiB. An excessively strict limitation of the titanium content would limit the use of scrap in material manufacture too much, therefore a maximum titanium content of 0.3 wt.-% is specified.

Zirconium forms fine intermetallic precipitation phases in aluminium materials, which counteract a coarsening of the grain size during heat treatments. Contents of a maximum of 0.20 wt.-% are sufficient for a sufficient effect.

Preferably, the cladding layer is made of an aluminium alloy of the type AA1xxx or AA8xxx, preferably of the type AA1050, AA1100, AA1200, AA8011, AA8014, AA8021 or AA8079. In addition to aluminium alloys of the type AA1xxx or AA8xxx, low-magnesium alloys of the type AA3xxx, AA4xxx or AA7xxx can also be used as a cladding layer.

According to a further advantageous embodiment, the corrosion potential of the cladding layer after soldering and after soldering with subsequent artificial ageing is less noble than the corrosion potential of the core layer. Preferably, the potential difference between the cladding layer and the core layer after soldering is at least 10 mV. The cladding layer as an outer or intermediate layer thus also acts as a sacrificial anode layer for improved corrosion resistance due to an increased, i.e. less noble, electrochemical potential.

If, according to a further advantageous embodiment of the composite material according to the invention, the cladding layer has 3% to 15% of the thickness of the entire aluminium composite material, the technical effect of the composite material according to the invention can be used without the strength of the aluminium composite material due to the outer layers and their proportion of the total thickness of the aluminium composite material being reduced too much.

The aluminium material or the aluminium composite material preferably has an average thickness of 0.1 mm to 5.0 mm and further preferably 0.2 mm to 3 mm or 0.5 mm to 2.0 mm. These thickness ranges can cover a wide range of applications with soldered joints, in particular also in the area of heat exchangers.

According to a second teaching of the present invention, the aforementioned object is solved by a method for the thermal joining of components made of an aluminium material or aluminium composite material according to the invention, in which soldering, preferably CAB or vacuum soldering, is carried out at a soldering temperature of at least 585° C., in that after heating to and holding at soldering temperature, the components are cooled from the soldering temperature to 200° C. at an average cooling rate of at least 0.5° C./s, at least 0.66° C./s or at least 0.75° C./s and the thermally joined components are artificially aged.

By setting the cooling rates after reaching and maintaining the soldering temperature, the aluminium material or the aluminium composite material according to the invention can be transferred to the T4 state by the selected cooling rate. After an artificial ageing, a significant increase in the strengths, in particular the yield strength $R_{p0.2}$ of the composite material can then be achieved such that new application areas and design possibilities, for example reductions in wall thicknesses for lightweight construction, result.

The aluminium material or the aluminium composite material according to the invention can be in a strain-hardened to soft state or a solution-annealed T4 state before soldering. Using the method according to the invention for thermal joining, the aluminium material or the aluminium composite material, as already mentioned, is brought to a solution-annealed T4 state. Due to the specially selected composition of the core material, the quenching sensitivity is set such that the soldering process acts as solution annealing and the quenching is achieved by the selected cooling rate. In this way, a cost-effective method for the thermal joining of components is enabled, in which the solution annealing and quenching are integrated into the soldering process and the soldered components can be hardened via an artificial ageing process.

According to a first advantageous embodiment of the method according to the invention, after the end of the holding time at the soldering temperature, cooling takes place at a cooling rate of at least 0.5° C./sec to 200° C., whereby cooling adapted to the quenching sensitivity of the aluminium material or of the aluminium composite material is achieved, which leads to the advantageous T4 state. If higher cooling rates are used, i.e. at least 0.66° C./s or at least 0.75° C./s or, for example, at least 1° C./s, the increase in the yield strength is even higher after an artificial ageing, for example at 205° C. for 45 minutes.

The method according to a further advantageous embodiment preferably comprises an artificial ageing of the soldered components at temperatures of between 100° C. and 280° C., preferably of between 140° C. and 250° C., preferably at 180 to 230° C., wherein the duration of the artificial ageing is at least 10 minutes, preferably at least 30 minutes or at least 45 minutes.

In the case of a longer duration and moderate temperature of the artificial ageing, for example at 165° C. for 16 h, the strength, in particular for example the yield strength values of the aluminium material or of the aluminium composite material, can be increased up to a maximum value. However, higher costs also arise due to the long annealing times for the method. In order to provide a cost-effective variant of the method, the artificial ageing can therefore be adapted to a subsequent production step. For example, the artificial ageing can be carried out for 20 minutes at 185° C. to 205° C. This enables the integration of artificial ageing into the baking interval of a cathodic dip coating.

According to a further advantageous embodiment of the method according to the invention, a battery cooling plate, a heat exchanger or a structural component of a motor vehicle is preferably soldered. A heat exchanger is a device that transfers thermal energy from one material flow to another. Battery cooling plates are used, for example, at different ambient temperatures and load conditions for the needs-based cooling and heating of battery systems, for example lithium-ion batteries in hybrid and electric vehicles. Structural components can consist of a plurality of individual parts, wherein the components are connected to one another by means of thermal joining. The method according to the invention for thermal joining permits an optimised design in particular for structural components consisting of a plurality of individual parts and for battery cooling plates. Due to the form-optimised alloy composition of the aluminium material or of the aluminium composite material according to the invention, in particular more complex 3D structures can be realised. For example, it is possible to expand the flat base plate of a battery cooling system into a 3D structure, for example a tray with small radii.

According to a third teaching of the present invention, the object shown above is achieved by using an aluminium material or aluminium composite material according to the invention to manufacture a component, in particular a battery cooling plate, a structural component or a heat exchanger, in a thermal joining process. Due to the advantageous properties, it allows the use of the aluminium material or the aluminium composite material according to the invention to manufacture a heat exchanger for example such that the heat exchanger can also assume a structural function due to the high strength. The use of the aluminium material or of the aluminium composite material for the manufacture of structural components makes it possible, for example, to replace alternative joining processes such as welding or forming processes such as hydroforming. When used to manufacture battery cooling plates, the aluminium material or the aluminium composite material according to the invention allows solderability and formability to be combined with a very high strength by precipitation hardening such that a lower wall thickness is required, whereby in turn weight can be reduced. In particular, the use comprises thermal joining, for example brazing in a CAB process, whereby advantageous properties of the aluminium material or of the aluminium composite material are achieved.

According to a first advantageous embodiment of the use according to the invention, the joining method takes place in a vacuum or in the presence of an inert gas. Compared to other high-strength materials with increased Mg content, the use of the aluminium material or of the aluminium composite material according to the invention offers the advantage that, in addition to the otherwise expensive vacuum soldering, the cost-effective CAB soldering with flux can also be used, wherein the need for expensive fluxes containing caesium is eliminated.

Finally, the above-mentioned object is achieved according to a further teaching by a thermally joined component comprising an aluminium material or aluminium composite material described above. In addition to the aluminium material or the aluminium composite material according to the invention, the thermally joined component can for example comprise a further metal or a further composite material. The aluminium composite material according to the invention can serve to join the further metal parts. The aluminium material according to the invention can also be joined, for example, by using a soldering foil or a solder layer of a separate component. Advantageous properties, such as for example particularly good soldering results, good corrosion resistance and strength can be achieved by the design of the aluminium material or of the aluminium composite material according to the invention.

According to an advantageous embodiment, the thermally joined component can be configured as a structural component of a motor vehicle, as a heat exchanger or as a battery cooling plate.

BRIEF DESCRIPTION OF THE DRAWINGS

The present invention will now be described in more detail in connection with the drawing, in which is shown.

DETAILED DESCRIPTION

Figure 1A:
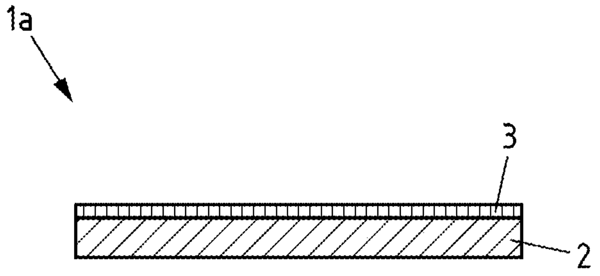
FIG. 1*a* to 1*g* show schematic representations of possible exemplary embodiments of the aluminium composite material and aluminium material in a sectional view.
Figure 1B:
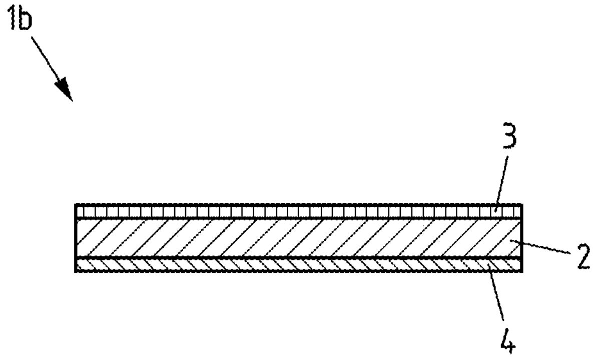
Figure 1C:
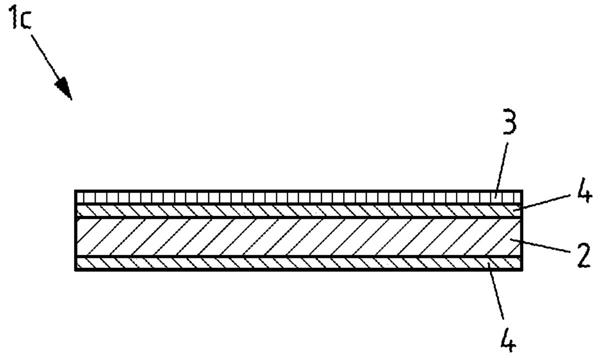
Figure 1D:
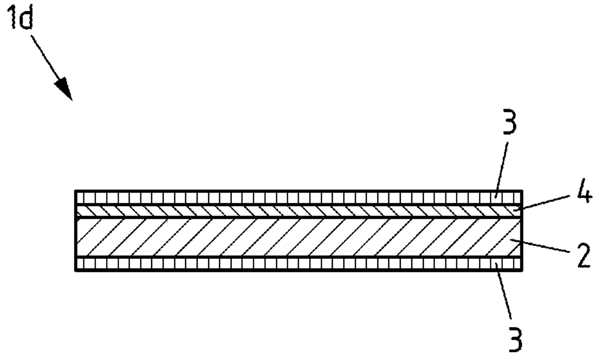
Figure 1E:
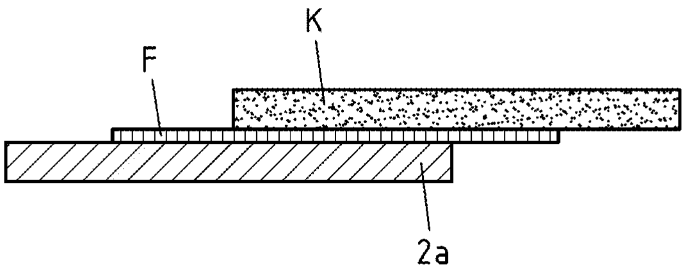
Figure 1F:
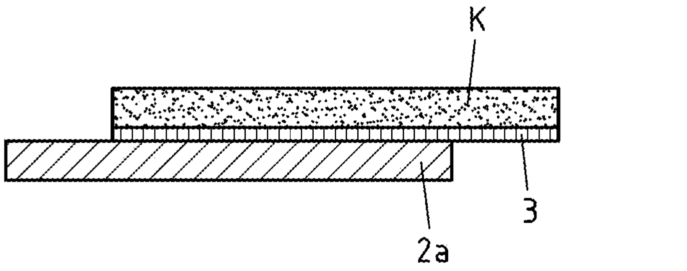
Figure 1G:
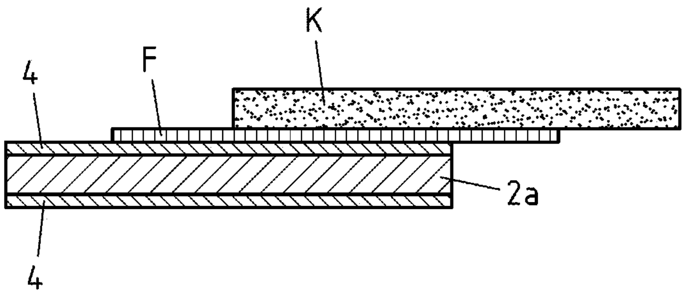

FIG. 1*a* shows a two-layer aluminium composite material, while FIG. 1*b* a three-layer variant and FIGS. 1*c* and 1*d* a four-layer variant of the aluminium composite material according to the invention. FIG. 1*a* shows a sectional view of an exemplary embodiment of an aluminium material according to the invention in the form of an aluminium composite material 1*a* with a core layer 2 and a solder layer 3. According to a further exemplary embodiment, the solder layer 3 can also be provided by a soldering foil F or a component K with a solder layer such that the aluminium material is at least in some areas directly in materially-bonded contact with at least one solder layer 3 after soldering. FIG. 1*e* to FIG. 1*g* show these exemplary embodiments.

The exemplary embodiment in FIG. 1*b* shows an aluminium composite material 1*b* with an aluminium material according to the invention as core layer 2, a solder layer 3 and an additional cladding layer 4. FIG. 1*c* illustrates a further exemplary embodiment of the aluminium material according to the invention in the form of a four-layer composite material 1*c* with a core layer 2 with a two-sided cladding layer 4 and an outer solder layer 3. If the solder layer 3 according to one exemplary embodiment is provided by a soldering foil or a further component with a solder layer, the aluminium material of the core layer 2 can be in indirect materially-bonded contact with the solder layer after soldering. In the present case, indirect materially-bonded contact is the contact of the core layer 2 with the solder layer 3 via the cladding layer 4. The four-layer composite material 1*c* can also be provided by an aluminium material 2*a* with cladding layers 4 by providing the solder layer 3 via at least one separate component K after soldering.

FIG. 1*d* shows a four-layer variant of the composite material 1*d* with a core layer 2, a cladding layer 4 arranged on the core layer 2 and two outer solder layers 3. Here too, an indirect materially-bonded contact can be designed between the aluminium material 2, here as a core layer of an aluminium composite material, and the solder layer 3 after soldering. Nevertheless, the properties according to the invention after soldering can also be achieved after soldering in such an exemplary embodiment, in which the solder layer is provided by a soldering foil or a further part or a further component. All aluminium composite materials 1*a*, 1*b*, 1*c* and 1*d* shown can for example be used for the manufacture of heat exchangers, structural components of motor vehicles or battery cooling plates.

FIG. 1*e* to FIG. 1*g* show by way of example exemplary embodiments in a sectional view in which the aluminium material 2*a* according to the invention has in sections direct materially-bonded contact after soldering. In FIG. 1*e*, the solder layer is provided by a soldering foil F. In FIG. 1*f*, the solder layer is provided by a further component K.

FIG. 1*g* shows an aluminium material 2*a* with a two-sided cladding layer, for example made of an AA8079 alloy, which is at least in some areas in indirect contact with a solder layer provided as a soldering foil F after soldering.

The properties of the aluminium material according to the invention are represented and described below on the basis of the embodiment as an aluminium composite material. However, it is apparent that in particular the measured strength properties are provided by the core alloy and thus by the aluminium material of the exemplary embodiments according to the invention. This means that the results can also be transferred to a single-layer aluminium material, which is in sections in direct or indirect materially-bonded contact with the solder layers after a soldering process. All information on the composition of the aluminium alloys refers to the state of the materials before soldering.

The aluminium composite materials 1*a*, 1*b*, 1*c*, 1*d* shown in FIG. 1*a* to 1*d* and the aluminium material 2*a* are usually present as strips, which were manufactured, for example, by hot rolling or roll cladding, wherein the total thickness can be 0.1 mm to 5 mm. Other manufacturing processes such as "simultaneous casting" with subsequent rolling are also conceivable for manufacturing the strips. The core layer 2 or the aluminium material 2*a* consists of an aluminium alloy of the type AlMgSi and has a solidus temperature Tsol of at least 595° C., wherein the aluminium composite material has an increase in the yield strength $R_{p0.2}$ compared to the state after soldering of at least 90 MPa, at least 110 MPa or preferably at least 120 MPa after soldering at at least 595° C. at an average cooling rate of at least 0.5° C./s from 595° C. to 200° C. and an artificial ageing at 205° C. for 45 minutes. In the case of the aluminium composite material 1*a*, 1*b*, 1*c*, 1*d* and the aluminium material 2*a*, the increase in the yield strength values can be attributed to the hardening of the core layer 2 by the artificial ageing and enables the economical provision of high-strength, soldered components, for example heat exchangers, battery cooling plates or structural components of a motor vehicle. The core layer 2 or the aluminium material 2*a* can for example have the following composition in wt.-%:

0.5%≤Si≤0.9%, preferably 0.50%≤Si≤0.65% or 0.60%≤Si≤0.75% or 0.50%≤Si≤0.60%,
Fe≤0.5%, preferably 0.05%≤Fe≤0.5%, particularly preferably 0.05%≤Fe≤0.3%,
Cu≤0.5%, preferably 0.05%≤Cu≤0.3% or 0.1%≤Cu≤0.3%,
Mn≤0.5%, preferably Mn≤0.2%, particularly preferably 0.01%≤Mn≤0.15%,
0.4%≤Mg≤0.8%, preferably 0.45%≤Mg≤0.8%, particularly preferably 0.45%≤Mg≤0.75%,
Cr≤0.3%, preferably Cr≤0.1%, particularly preferably Cr≤0.05%,
Zn≤0.3%, preferably ≤0.05%,
Ti≤0.3%,
Zr≤0.1%, particularly preferably Zr≤0.05%, the remainder Al and unavoidable impurities individually a maximum of 0.05%, in total a maximum of 0.15%.

This AlMgSi core alloy or alloy of the aluminium material has a low quenching sensitivity and at the same time has a sufficiently high solidus temperature Tsol such that melting during soldering is avoided. With a low quenching sensitivity, a solution-annealed, quenched T4 structural state is already provided after soldering at cooling rates from 0.5° C./s from 595° C. to 200° C., which causes the significant increase in the yield strength in an artificial ageing.

In a two-layer variant of the aluminium composite material 1*a*, it has an outer layer, which is configured as a solder layer 3. Preferably, the aluminium solder alloy of the solder layer has the following composition in wt.-%:

7.0%≤Si≤13.0%,
Fe≤0.8%,
Cu≤2.5%,
Mn≤0.1%,
Mg≤0.1%,
Cr≤0.1%,
Zn≤2.5%,
Ti≤0.3%,
Zr≤0.1%, the remainder Al and unavoidable impurities individually a maximum of 0.05%, in total a maximum of 0.15%.

For example, the solder layer consists of an aluminium solder alloy of the type AA4045 or AA4343. The thickness of the solder layer 3 is typically 5% to 15% of the total thickness of the composite material. In principle, the aluminium composite material 1*a* can also be provided with a solder layer 3 on both sides (not shown here).

According to a further exemplary embodiment, as FIG. 1*b* shows, a cladding layer 4, which has an aluminium alloy with an Mg content of <0.1 wt.-%, preferably <0.05 wt.-%, can be applied on the core layer 2 in order to provide improved properties of the aluminium composite material 1 in terms of formability, solderability and corrosion protection. In a particularly preferred embodiment, the cladding layer 3 has an aluminium alloy with the following composition in wt.-%:

Si≤1.0%,
Fe≤2.0%, preferably 0.1%≤Fe≤2.0%,
Cu≤0.3%,
Mn≤0.3%,
Mg≤0.1%, preferably ≤0.05%,
Cr≤0.1%,
Zn≤2.0%,
Ti≤0.3%,
Zr≤0.1%, the remainder Al and unavoidable impurities individually a maximum of 0.05%, in total a maximum of 0.15%. The cladding layer 3 preferably has 3% to 15% of the thickness of the entire aluminium composite material 1,1'.

In addition to this embodiment of the aluminium composite material 1, in which three layers are provided, wherein the cladding layer 4 is arranged on one side and the solder layer 3 on the other side of the core layer 2, it is also conceivable, as represented in FIG. 1*c* and FIG. 1*d*, that a cladding layer 4 is arranged between the core layer 2 and a solder layer 3. These embodiments are particularly advantageous for corrosion protection. Furthermore, a five-layer variant can be provided, wherein in each case a cladding layer 4 lies on both sides of the core layer 2 and between the core layer 2 and in each case an outer solder layer 3.

Eight composite materials 1-8 were manufactured with the layer structure mentioned in Table 1. The composite materials 1 and 2 have a cladding layer 4 on both sides of the core layer 2. A solder layer 3 is plated on a cladding layer 4. The composite materials 3 to 6 are two-layered and, in addition to the core layer, only have a one-sided solder layer 3. The composite material 7 is again configured in four layers, but only has on one side of the core layer 2 a cladding layer 4 and a two-sided solder layer 3. Finally, composite material 8 has a core layer 2 with a cladding layer applied thereon.

The aluminium alloys of the core layer, the cladding layer and the solder layer with the chemical composition indicated in Table 2 were melted and cast as rolling ingots in the so-called direct chill casting process. In a first step, the rolling ingots for the cladding layer and the solder layer were preheated to a rolling temperature in the range of 450° C. to 525° C. and hot-rolled to the required layer thickness. The cast ingots of the core material were subjected to homogenisation annealing at 575° C. with a holding time of 6 h and then joined together with the pre-rolled plates of the cladding layer and of the solder material to form a so-called plating packet. This plating packet was preheated to a rolling temperature in the range of 450° C. to 500° C. and hot-rolled to a thickness of 7 mm. The test materials were then cold-rolled to the end thicknesses indicated in Table 1.

TABLE 1

| Sample no. | Comparison/ Invention | Number of layers | Core | D (mm) | Solder alloy no./(thickness in %) | Cladding layer (thickness in %) |
|---|---|---|---|---|---|---|
| 1 | Comparison | 4 | 1 | 2.5 | 6/(5%) | 5/(5%) |
| 2 | Invention | 4 | 2 | 2.5 | 6/(5%) | 5/(5%) |
| 3 | Comparison | 2 | 3 | 1.5 | 6/(5%) | — |
| 4 | Invention | 2 | 2 | 2.5 | 6/(5%) | |
| 5 | Comparison | 2 | 3 | 1.5 | 6/(5%) | |
| 6 | Comparison | 2 | 4 | 0.92 | 6/(5%) | |
| 7 | Invention | 4 | 7 | 2.5 | 6/(5%) | 8 (5%) |
| 8 | Invention | 3 | 9 | 2.0 | — | 10 (7.5%) |

The solidus temperatures Tsol indicated in Table 2 were calculated using the commercial software FactSage 7.0 and associated thermodynamic databases for aluminium.

TABLE 2

Chemical composition [wt.-%] of the layers of the composite materials

| Alloy | Function | Si | Fe | Cu | Mn | Mg | Cr | Zn | Ti | Tsol |
|---|---|---|---|---|---|---|---|---|---|---|
| 1 | Core | 0.44 | 0.24 | 0.04 | 0.05 | 0.61 | 0.05 | 0.00 | 0.01 | 618° C. |
| 2 | Core | 0.74 | 0.19 | 0.08 | 0.09 | 0.59 | 0.00 | 0.00 | 0.02 | 600° C. |
| 3 | Core | 0.60 | 0.29 | 0.29 | 0.34 | 0.22 | 0.11 | 0.08 | 0.01 | 619° C. |
| 4 | Core | 1.0 | 0.27 | 0.03 | 0.11 | 0.40 | 0.01 | 0.04 | 0.02 | 593° C. |
| 5 | Cladding layer | 0.07 | 0.87 | 0.00 | 0.021 | 0.00 | 0.00 | 0.01 | 0.01 | 650° C. |
| 6 | Solder layer | 10.1 | 0.17 | 0.00 | 0.00 | 0.00 | 0.00 | 0.00 | 0.01 | 575° C. |
| 7 | Core | 0.53 | 0.18 | 0.14 | 0.10 | 0.49 | 0.001 | 0.00 | 0.00 | 612° C. |
| 8 | Cladding layer | 0.03 | 0.24 | — | — | — | — | — | — | |
| 9 | Core | 0.64 | 0.16 | 0.10 | 0.07 | 0.61 | 0.01 | 0.01 | 0.02 | 605° C. |
| 10 | Cladding layer | 0.04 | 0.24 | 0.00 | 0.00 | 0.00 | 0.00 | 0.00 | 0.01 | — |

In order to assess the strength, tensile tests were first carried out on differently composed aluminium composite materials. The results for the yield strength $R_{p0.2}$, the tensile strength Rm and for the elongation at break A50 mm after simulated soldering and after artificial ageing can be found in Table 3.

In simulated soldering, the samples were heated to 595° C. as representative of a typical soldering temperature, held at the soldering temperature for 6 minutes and then cooled to 200° C. at the specified average cooling rate. The average cooling rate is calculated as the temperature difference divided by the time taken to reach 200° C.

In Table 3, artificial ageing is indicated in the State column, where "45 min @ 205° C." means artificial ageing for 45 minutes at 205° C. metal temperature. "14 d @ RT" indicates an exposure at room temperature for 14 days.

While samples 1 to 8 achieved values for the yield strength $R_{p0.2}$ between 42 MPa and 62 MPa in the soldered state, it is clear from the results that after an artificial ageing of 205° C. for 45 minutes, an increase of the yield strength $R_{p0.2}$ by at least 90 MPa and thus yield strengths $R_{p0.2}$ of more than 150 MPa could only be achieved with the samples 2, 4, 7 and 8 according to the invention. Due to the selected composition of the aluminium material of the core layer, the quenching sensitivity is set here such that the soldering process can, for example, act in a typical CAB process with subsequent cooling as a solution annealing with quenching when setting the lower limit for the cooling rate and the material is therefore in the T4 state after soldering. As a result, yield strengths $R_{p0.2}$ of more than 150 MPa were achieved with a short artificial ageing of 45 min at 205° C. Although the composite material 6 also shows a corresponding increase in the yield strength $R_{p0.2}$, the core layer has an excessively high Si content and thus an excessively low solidus temperature Tsol, such that the composite material 6 tends to melt during soldering. The samples 1, 3 and 5 have compositions of the core material not according to the invention. Samples 3 and 5 have excessive contents of Mn and Cr, such that due to the increased quenching sensitivity, a sufficient increase in strength could not be achieved at the cooling rates adjustable in the soldering process.

TABLE 3

Tensile test characteristics

| Sample no. | C/I | Average cooling rate | State | $R_{p0.2}$ [MPa] | Rm [MPa] | A50 mm [%] |
|---|---|---|---|---|---|---|
| 1 | Comparison | 1° C./s | Soldered | 42 | 137 | 26 |
| | | | soldered + 45 min @ 205° C. | 95 | 161 | 19 |
| | | | soldered + 4 h @ 185° C. | 151 | 198 | 16 |
| | | | soldered + 16 h @ 165° C. | 185 | 227 | 15 |
| | | | soldered + 14 d @ RT | 65 | 67 | 28 |
| 2 | Invention | 1° C./s | Soldered | 59 | 64 | 27 |
| | | | soldered + 45 min @ 205° C. | 203 | 255 | 13 |
| | | | soldered + 4 h @ 185° C. | 219 | 268 | 11 |
| | | | soldered + 16 h @ 165° C. | 232 | 281 | 12 |
| | | | soldered + 14 d @ RT | 89 | 200 | 25 |
| 3 | Comparison | 0.833° C./s | Soldered | 45 | 138 | 22 |
| | | | soldered + 45 min @ 205° C. | 47 | 151 | 26 |
| | | | soldered + 4 h @ 185° C. | 48 | 151 | 27 |
| | | | soldered + 16 h @ 165° C. | 74 | 159 | 19 |
| | | | soldered + 14 d @ RT | 52 | 161 | 27 |
| 4 | Invention | 0.833° C./s | Soldered | 60 | 171 | 26.5 |
| | | | soldered + 45 min @ 205° C. | 207 | 262 | 12.6 |
| | | | soldered + 4 h @ 185° C. | 236 | 282 | 11.5 |
| | | | soldered + 16 h @ 165° C. | 237 | 290 | 13.4 |
| | | | soldered + 14 d @ RT | — | — | — |
| 5 | Comparison | 0.833° C./s | Soldered | 45 | 149 | 23.8 |
| | | | soldered + 45 min @ 205° C. | 47 | 151 | 24.6 |
| | | | soldered + 4 h @ 185° C. | 48 | 151 | 25.9 |
| | | | soldered + 16 h @ 165° C. | 74 | 159 | 18.3 |
| | | | soldered + 14 d @ RT | 52 | 161 | 25.1 |

TABLE 3-continued

| Tensile test characteristics | | | | | | |
|---|---|---|---|---|---|---|
| Sample no. | C/I | Average cooling rate | State | $R_{p0.2}$ [MPa] | Rm [MPa] | A50 mm [%] |
| 6 | Comparison | 1° C./s | Soldered | — | | |
| | | | soldered + 45 min @ 205° C. | 168 | 228 | 10.1 |
| | | | soldered + 4 h @ 185° C. | | | |
| | | | soldered + 16 h @ 165° C. | | | |
| | | | soldered + 14 d @ RT | 85 | 192 | 17.2 |
| 7 | Invention | 0.833° C./s | soldered | 48 | 148 | 25.6 |
| | | | soldered + 45 min @ 205° C. | 163 | 213 | 24.0 |
| | | | soldered + 4 h @ 185° C. | 207 | 247 | 11.1 |
| | | | soldered + 16 h @ 165° C. | 225 | 268 | 12.1 |
| | | | soldered + 14 d @ RT | 75 | 183 | 22.3 |
| 8 | Invention | 0.833° C./s | soldered | 62 | 159 | 25.3 |
| | | | soldered + 45 min @ 205° C. | 195 | 241 | 24.0 |
| | | | soldered + 4 h @ 185° C. | 215 | 255 | 11.1 |
| | | | soldered + 16 h @ 165° C. | 213 | 260 | 12.1 |
| | | | soldered + 14 d @ RT | 91 | 196 | 22.3 |

The quenching sensitivity of the alloy, which is determined by the chemical composition, and the real cooling rate, which is set in the soldering process after the holding time is complete, are important for effective precipitation hardening after the soldering process. Table 4 shows the strengths achievable for different cooling rates using the example of the aluminium composite material No. 2 according to the invention.

TABLE 4

| Tensile test characteristics vs. Cooling rate | | | | | |
|---|---|---|---|---|---|
| Soldering temperature and holding time | Average Cooling rate soldering temperature up to 200° C. | Artificial ageing | $R_{p02}$ [MPa] | $R_m$ [MPa] | A [%] |
| 595° C. 6 min | 0.66° C./s | 45 min at 205° C. | 185 | 243 | 16.0 |
| 595° C. 6 min | 0.5° C./s | 45 min at 205° C. | 165 | 230 | 17.0 |
| 595° C. 6 min | 0.33° C./s | 45 min at 205° C. | 133 | 206 | 18.0 |
| 595° C. 6 min | 0.16° C./s | 45 min at 205° C. | 50 | 149 | 27.4 |

Table 4 shows that a cooling rate of at least 0.5° C./s is required in order to achieve a strength level according to the invention with $R_{p0.2}$ greater than 150 MPa in the aluminium composite material No. 2.

Figure 2:
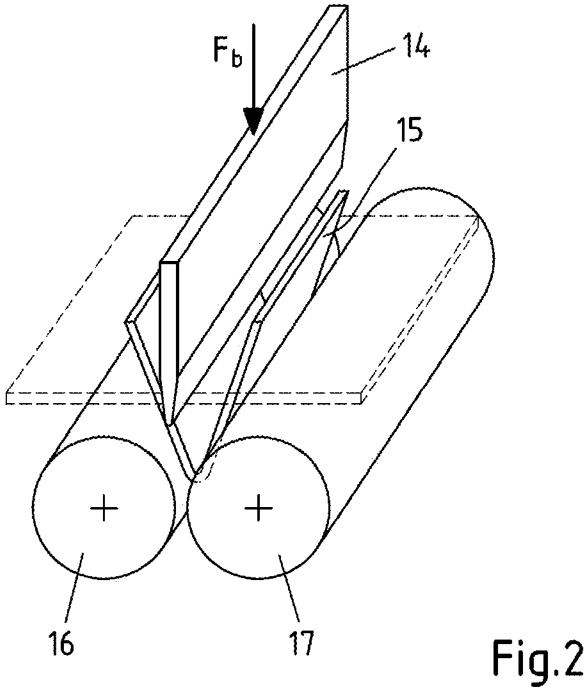
FIG. 2 shows, in a perspective representation, the test arrangement for carrying out the bending test.

FIG. 2 shows in a perspective view the test arrangement for carrying out the bending tests to determine the maximum bending angle. The tests are based on the specification of the German Association of the Automotive Industry (VDA) 238-100. The test arrangement consists of a bending punch 14, which, in the present case, has a punch radius of 0.4 mm. The sample 15 was previously cut out transversely to the rolling direction with a size of 250 mm×68 mm. Sample 15 was then subjected to two annealings, wherein the first annealing simulates the typical temperature profile of CAB soldering, wherein the soldering temperature at 595° C. with a holding time of 5 minutes and the cooling rate>0.5° C./sec to 200° C. were maintained, and the second annealing corresponds to an artificial ageing for 45 min at 205° C.

The sample 15 was then cut to a size of 60×60 mm, wherein the edges were milled over and fed to the bending device. When bending the sample through the bending punch, which has a punch radius of 0.4 mm, the force with which the bending punch bends the sample is measured and, after exceeding a maximum and a drop of this maximum of 60 N, the bending process is ended. The opening angle of the curved sample is then measured. The bending behaviour of the sample is generally measured transversely to the rolling direction in order to obtain a reliable statement regarding the bending behaviour during the manufacture of components with high forming requirements. In the present case, the bending behaviour transverse to the rolling direction was tested in the solder-simulated and artificially-aged state, since the bending angle correlates with the ductility in the event of a crash.

Figure 3:
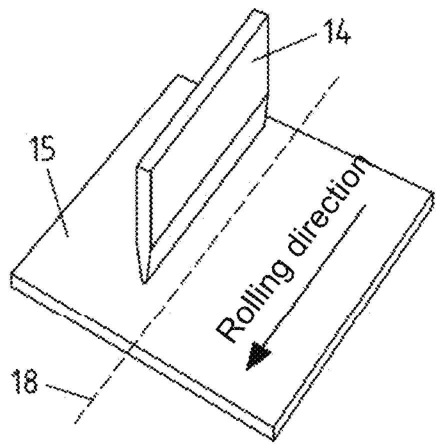
FIG. 3 shows, in a perspective schematic representation, the arrangement of the bending punch in relation to the rolling direction when carrying out the bending test.
Figure 4:
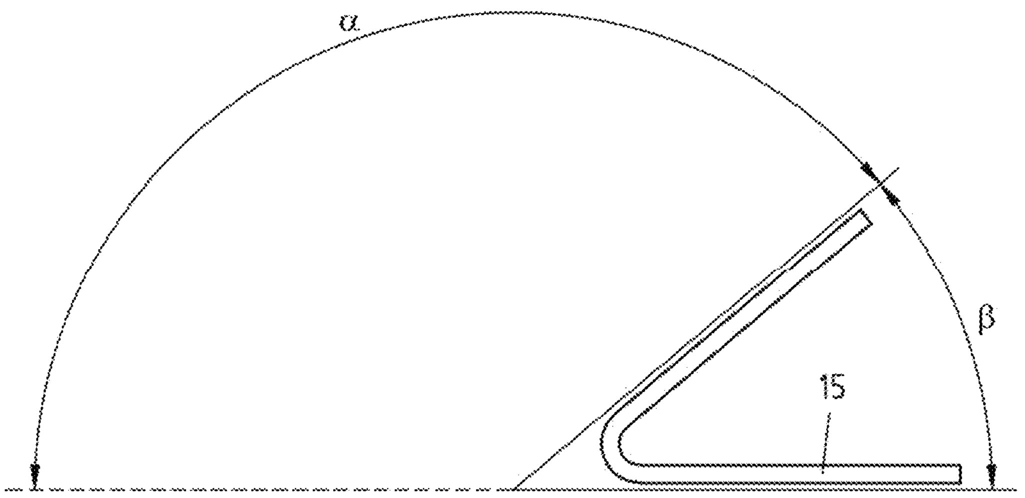
FIG. 4 shows schematically the measurement of the bending angle on a curved sample according to an exemplary embodiment.

For example, the bending punch 14, which, as represented in FIG. 3, runs parallel to the rolling direction such that the bending line 18 also runs parallel to the rolling direction, presses the sample with a force Fb between two rollers 16, 17 with a roll diameter of 30 mm, which are arranged at a distance of twice the sample thickness+0.5 mm. While the bending punch 14 bends the sample 15, the punch force Fb is measured. If the punch force Fb reaches a maximum and then drops by 60 N, the maximum achievable bending angle is reached. The sample 15 is then removed from the bending device and the bending angle is measured, as represented in FIG. 4. The indicated bending angles were calculated on a reference thickness of 2 mm using the formula:

$$\alpha_{standard}=\alpha_{measurement}\times(d_m^{1/2}/d_{standard}^{1/2})$$

where $\alpha_{standard}$ is the standardised bending angle, $\alpha_{measurement}$ is the measured bending angle, $d_{standard}$ is the standardised sheet thickness 2 mm and $d_m$ is the measured sheet thickness.

In the present case, the bending test was carried out on different aluminium composite materials no. 9 and 10. Table 5 shows the different variants that were examined.

TABLE 5

| Sample no. | Comparison/ Invention | Number of layers | Solder layer alloy (thickness in %) | Core layer no. | Cladding layer no., (thickness in %) |
|---|---|---|---|---|---|
| 9 | Invention | 2 | 6 (5%) | 2 | — |
| 10 | Invention | 4 | 6 (5%) | 2 | 5, both sides, (5% each) |

The results are shown in Tables 6a and 6b. While bending angles of $80° > \alpha_{standard} > 50°$ were expected, the samples manufactured according to the invention achieved a bending angle $\alpha_{standard}$>80°, which is associated with very good crash properties.

While test sample no. 9 was plated on one side with a solder layer 4 and a layer thickness of 5%, test sample 10 was plated on both sides with a cladding layer 3 consisting of alloy no. 5 of the type AA8079 with a layer thickness of 5% and on one side with an outer solder layer 4 of alloy no. 6 with a layer thickness of 5%. For the test samples 9 and 10 in Table 6a, the solder side was aligned with the rollers 16, 17 in each case. In the test samples 9 and 10 in Table 6b, the solder side of the aluminium composite material was aligned with the punch 14.

As already stated, it was shown that sample 10 with a cladding layer 3 allowed significantly higher bending angles than sample 9 manufactured from conventional mono-AA6xxx alloys with a solder layer. Cladding layer 3 therefore results in higher ductility in the event of a crash. The combination of a higher-strength core material with ductility-enhancing plating improves performance in the event of a crash, for example of a structural component.

TABLE 6a

| Solder side aligned with the rollers | | | |
|---|---|---|---|
| Sample no. | | Opening angle $\beta_{standard}$ [°] | Bending angle $\alpha_{standard}$ [°] |
| 9 | Invention | 123 | 57 |
| 10 | Invention | 93 | 87 |

TABLE 6b

| Solder side aligned with the punch | | | |
|---|---|---|---|
| Sample no. | | Opening angle $\beta_{standard}$ [°] | Bending angle $\alpha_{standard}$ [°] |
| 9 | Invention | 103 | 77 |
| 10 | Invention | 91 | 89 |

Figure 5:
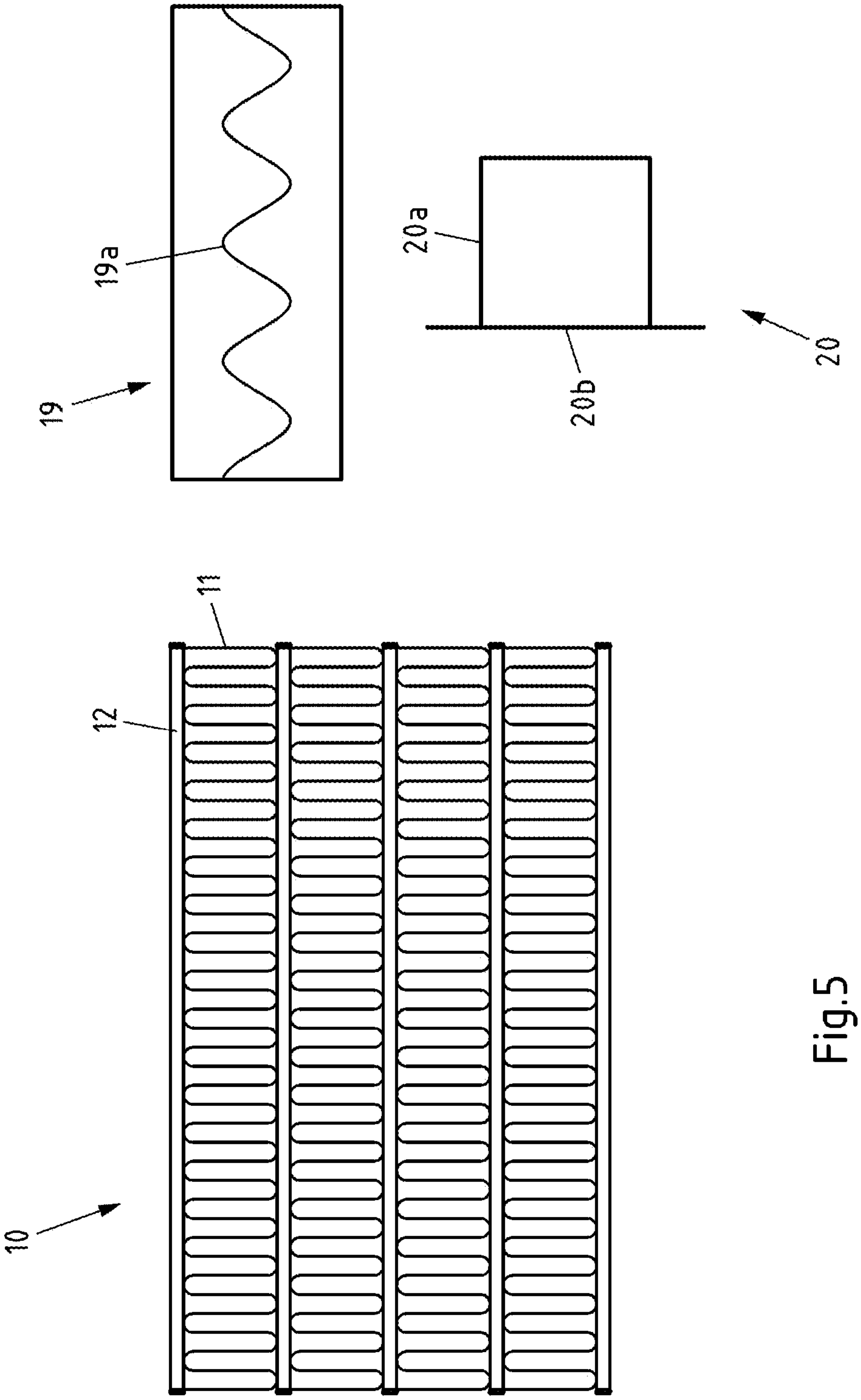
FIG. 5 shows, in a schematic representation, exemplary embodiments for a heat exchanger, a battery cooling plate and a structural component of a motor vehicle.

FIG. 5 shows in a schematic top view an exemplary embodiment of a heat exchanger 10, a battery cooling plate 19 and a structural part of a motor vehicle 20. The components of the heat exchanger, for example the fins 11 of the heat exchanger 10, consist of an aluminium material 1*a*, 1*b*, 1*c*, 1*d*, 1*e*, if described above according to the invention, which is blank or coated on both sides with an aluminium solder. The fins 11 are soldered to tubes 12 in a meander-shaped manner such that a large number of soldered connections are required. Instead of tubes 12, formed plates can also be used which form cavities for guiding media. The tubes 12 can also be manufactured from the aluminium composite material 1 according to the invention. Since they carry the medium and must therefore be protected against corrosion, they can be manufactured with an aluminium composite material according to the invention with a cladding layer 3. A heat exchanger 10 can be exposed, when used for example in a motor vehicle, to corrosive substances, such that the use of the aluminium composite material 1 according to the invention with cladding layer 3 is particularly advantageous.

The battery cooling plate 19 is shown in a sectional view parallel to the plate plane. A battery cooling plate is usually a large-surface component with meander-shaped cooling channels 19a, which are sealed by a soldered sheet metal as the upper part, not shown here. The parts of the battery cooling plate preferably consist of the described aluminium composite material in order to provide the necessary strength after soldering.

In a sectional view, a structural component 20 of a motor vehicle is represented as an example in the form of a closed, soldered profile consisting of a U-profile 20a and a striking plate 20b soldered thereto. These typical structural components of a motor vehicle can be provided with the aluminium composite material according to the invention having high strength.

Alternatively, an aluminium material according to the invention can also be used which, after soldering with a solder layer, is at least in some areas in direct or indirect materially-bonded contact with a solder layer, which is provided, for example, by a soldering foil or a solder component, in order to achieve the advantages according to the invention in relation to the properties of the soldered component from FIG. 5.

The invention claimed is:

1. An aluminium composite material for the manufacture of high-strength, soldered components, the aluminium composite material comprising:

a core layer comprising an aluminium alloy of the type AA6XXX; and at least one cladding layer comprising an aluminium cladding alloy, the at least one cladding layer being provided on one side or both sides of the core layer;

wherein the aluminium alloy of the core layer has a solidus temperature Tsol of at least 595° C. and wherein after soldering of the component the aluminium composite material is at least in some areas directly or indirectly materially-bonded with at least one solder layer comprising an aluminium solder alloy, and the aluminium alloy of the core layer is configured to provide, after soldering at at least 595° C. and cooling at an average cooling rate of 0.5° C./s from 595° C. to 200° C. and an artificial ageing at 205° C. for 45 minutes, an increase in the yield strength $R_{p0.2}$ of at least 90 MPa compared to the state after soldering and before said artificial ageing;

wherein the aluminium alloy of the type AA6xxx has the following composition in wt.-%:

0.5%≤Si≤0.9%;

Fe≤0.5%;

Cu≤0.14%;

Mn≤0.5%;

0.4%≤Mg≤0.8%;

Cr≤0.3%;

Zn≤0.3%;

Ti≤0.3%;

Zr≤0.1%;

the remainder Al and unavoidable impurities individually a maximum of 0.05%, in total a maximum of 0.15%;

wherein the aluminium cladding alloy has the following composition in wt.-%:

Si≤1.0%;

Fe≤2.0%;

Cu≤0.3%;

Mn≤0.3%;

Mg≤0.1%;

Cr≤0.1%;

Zn≤2.0%;

Ti≤0.3%;

Zr≤0.20%;

the remainder Al and unavoidable impurities individually a maximum of 0.05%, in total a maximum of 0.15%;

wherein the aluminium solder alloy, to which the aluminium composite material is directly or indirectly materially-bonded, has the following composition in wt.-%:

5.0%≤Si 13.0%;
Fe≤0.8%;
Cu≤2.5%;
Mn≤0.1%;
Mg≤0.1%;
Cr≤0.1%;
Zn≤2.5%;
Ti≤0.3%;
Zr≤0.1%;

the remainder Al and unavoidable impurities individually a maximum of 0.05%, in total a maximum of 0.15%; and wherein the at least one cladding layer has 3% to 15% of the thickness of the entire aluminium composite material.

2. The aluminium composite material of claim 1, wherein the aluminium material, after soldering at at least 595° C. and cooling at an average cooling rate of at least 0.5° C./s from 595° C. to 200° C. and an artificial ageing at 205° C. for 45 minutes, has a yield strength $R_{p0.2}$ of at least 160 MPa.

3. The aluminium composite material of claim 1, wherein the at least one cladding layer comprises at least one one-sided or two-sided outer cladding layer in direct contact with the core layer.

4. The aluminium composite material of claim 1, wherein the aluminium composite material comprises the at least one solder layer and wherein the at lest one solder layer comprises at least one one-sided or two-sided outer solder layer.

5. The aluminium composite material of claim 4, wherein the thickness of the at least one solder layer is 3% to 15% of the aluminium composite material.

6. The aluminium composite material of claim 3, wherein the aluminium cladding alloy comprises an Mg content of <0.05 wt.-%.

7. The aluminium composite material of claim 3, wherein the aluminium cladding alloy of the cladding further comprises 0.1%≤Fe≤2.0%.

8. The aluminium composite material of claim 3, wherein the corrosion potential of the cladding layer after soldering is less noble than the corrosion potential of the aluminium core alloy layer.

9. A method for the thermal joining of components made of the aluminum composite material of claim 1, in which soldering, preferably CAB or vacuum soldering, is carried out at a soldering temperature of at least 585° C., wherein after heating to and holding at soldering temperature, the components are cooled from the soldering temperature to 200° C. at an average cooling rate of at least 0.5° C./s, at least 0.66° C./s or at least 0.75° C./s and the thermally joined components are artificially aged after soldering.

10. The method of claim 9, wherein the artificial ageing of the soldered components is carried out at temperatures of between 100° C. and 280° C., preferably of between 140° C. and 250° C., preferably at 180 to 230° C., wherein the duration of the artificial ageing is 10 minutes, preferably at least 30 minutes or at least 45 minutes.

11. The method of claim 9, wherein a battery cooling plate, a heat exchanger or a structural component of a motor vehicle is soldered.

12. A method, comprising: utilizing the aluminum composite material of claim 1 for manufacturing a battery cooling plate, a heat exchanger or a structural component of a motor vehicle.

13. A soldered component, wherein the component is designed as a battery cooling plate, as a structural component of a motor vehicle or as a heat exchanger, comprising the aluminum composite material of claim 1.

14. The aluminium composite material according to claim 3, wherein the corrosion potential of the cladding layer after brazing is less noble than the corrosion potential of the aluminium core alloy layer and the potential difference between the cladding layer and the aluminium alloy core layer after brazing is greater than 10 mV.

15. An aluminium material for the manufacture of high-strength, soldered components, the aluminium material comprising an aluminium alloy of the type AA6xxx, wherein the aluminium alloy has a solidus temperature Tsol of at least 595° C. and wherein after soldering of the component the aluminium material is at least in some areas directly or indirectly in materially-bonded contact with at least one solder layer comprising an aluminium solder alloy, and the aluminium material is configured to have, after soldering at at least 595° C. and cooling at an average cooling rate of 0.5° C./s from 595° C. to 200° C. and an artificial ageing at 205° C. for 45 minutes, has an increase in the yield strength $R_{p0.2}$ of at least 90 MPa compared to the state after soldering and before said artificial ageing;

wherein the aluminium alloy of the type AA6xxx has the following composition in wt.-%:

0.5%≤Si≤0.9%;
Fe≤0.5%;
Cu≤0.14%;
Mn≤0.5%;
0.4%≤Mg≤0.8%;
Cr≤0.3%;
Zn≤0.3%;
Ti≤0.3%;
Zr≤0.1%;

the remainder Al and unavoidable impurities individually a maximum of 0.05%, in total a maximum of 0.15%.

* * * * *